Sept. 2, 1952 J. L. C. McDONNELL 2,608,928
FRANKFURTER TOASTER
Filed Oct. 12, 1950
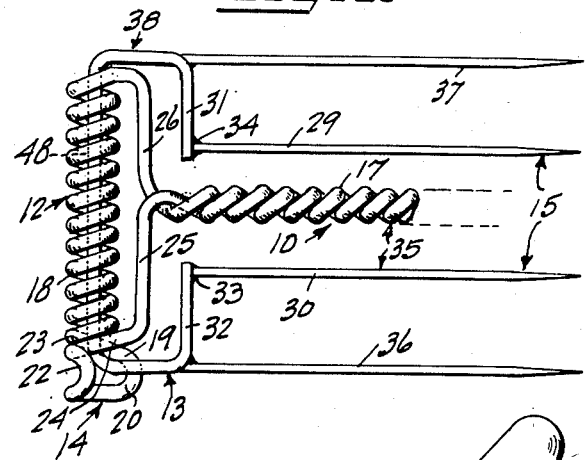
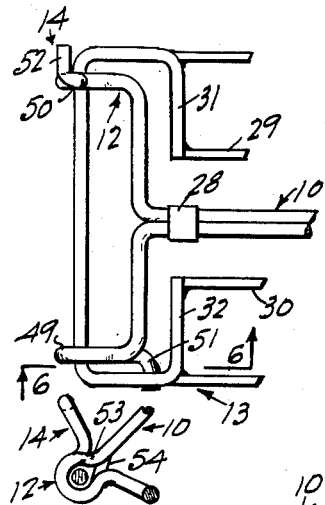
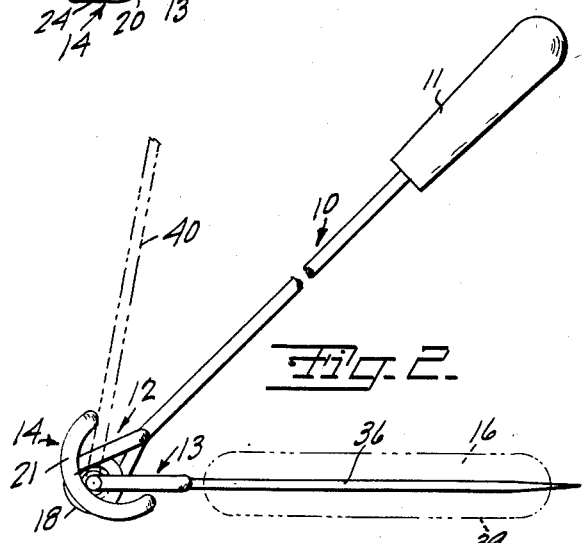
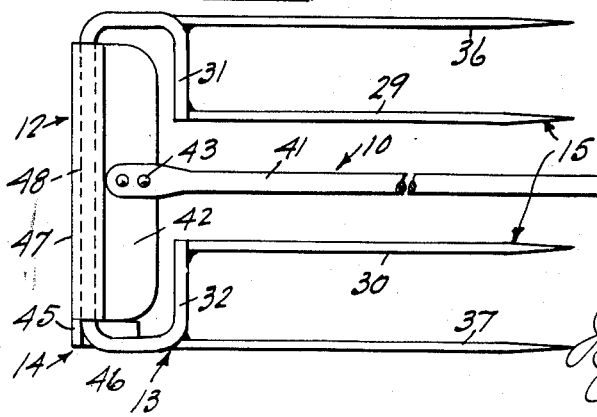
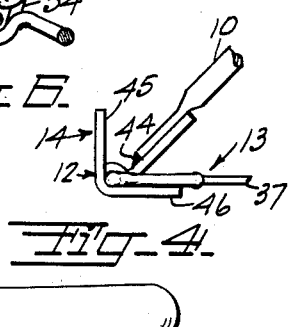
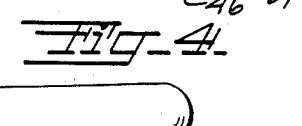
INVENTOR.
James L. C. McDonnell
BY Philip A. Friedell
Attorney Patented Sept. 2, 1952

2,608,928

UNITED STATES PATENT OFFICE 2,608,928

FRANKFURTER TOASTER

James L. C. McDonnell, Castro Valley, Calif.

Application October 12, 1950, Serial No. 189,832

2 Claims. (Cl. 99—421)

This invention relates to improvements in frankfurter toasters and provides a device to carry a plurality of frankfurters in a plane substantially parallel to the ground while the handle is held angularly downward, the most convenient position for holding a device of this nature over a bonfire or the like, and which, upon rotating the handle through an angle of 180 degrees will cause the frankfurters with their holder to flop over to assume the same angle relative to the handle, thus assuring even toasting throughout the length of the frankfurter on both top and bottom.

It is well known that various devices have been advanced for toasting frankfurters and the like, but all so far as known, hold the frankfurter in some specific relation to the handle, and it is believed that the present invention is the first to provide a device of this nature which automatically positions the frankfurter in the same plane when the handle is turned.

This device can be formed in a number of different ways, several of which forms are shown in the drawings, all operating in the same manner. The principal feature of this invention resides in the fork member which has a gap of sufficient width to cause the frankfurters which are impaled on the tines to pass the handle, and stops which limit the angularity of the fork relative to the handle to a predetermined degree in each direction.

The objects and advantages of the invention are as follows:

First, to provide a frankfurter toaster which will support frankfurters in a substantially level plane when the handle therefor is held in a downwardly inclined position over a fire and turn and support the frankfurters in the same plane when the handle is rotated through a half turn.

Second, to provide a frankfurter toaster with a handle and a shank with a fork hinged to the end of the shank on a transverse axis and including stop members to limit the angular movement of the fork on respective sides of the shank.

Third, to provide a toaster as outlined in which the movement of the fork relative to the shank is limited to an angle of less than 45 degrees.

Fourth, to provide a toaster as outlined in which the fork has a central gap to pass by the handle when swinging from one position to the other and with the tines on the fork sufficiently spaced from the handle to clear frankfurters impaled thereon.

Fifth, to provide a toaster as outlined which is simple in construction and arrangement and economical to manufacture and which requires a minimum of space for storage.

In describing the invention reference will be had to the accompanying drawings, in which:

Fig. 1 is a top plan view of the invention.

Fig. 2 is a side elevation of Fig. 1 with the shank of the handle modified to show a straight rod instead of a pair of twisted together rods.

Fig. 3 is a modification of the invention showing a top plan view with the head formed of sheet metal and including a plain rod for a shank.

Fig. 4 is a fragmentary side elevation of Fig. 3, showing the hinge connection and fork stops.

Fig. 5 is a fragmentary top plan view of a simplified modification of the all wire construction.

Fig. 6 is a section taken on line 6—6 of Fig. 5.

The invention includes a shank 10 terminating at one end in a handle 11 and at the other end in a head 12 and in which head a fork 13 is pivotally mounted, and including stops 14 for limiting the angular movement of the fork relative to the handle, with the fork projecting in the same direction as the handle and having a gap 15 to pass the shank with sufficient clearance for frankfurters 16 impaled on the tines to clear the shank when the fork is changed from one angular position to the other relative to the handle.

In the form illustrated in Fig. 1 the shank 17 and head 10 are formed of a single length of wire, the central portion being formed into a coil to provide a pintle sleeve 18 with the wire at one end of the coil indicated at 19 being extended forwardly underneath, then turned 180 degrees as indicated at 20 about a vertical axis and formed to an arc about the horizontal axis as indicated at 22 and then brought back adjacent the last coil 23 as indicated at 24 and extended rearwardly and toward the center as indicated at 25 to meet the extension from the other end of the coil which is reversely formed as indicated at 26, the remaining portions of the wire then being twisted together as indicated at 17 in Fig. 1 to any desired length, or the two remaining portions of the wire may be extended parallel to each other as indicated in Figs. 2 and 5, and bound together by suitable means such as by clips 28 as indicated in Fig. 5.

The fork consists of another length of wire bent to C-shape with the back of the C forming a pintle which is rotatable in the pintle sleeve, and tines 29 and 30 have their butt ends but welded to the inner ends of the arms 31 and 32 as indicated at 33 and 34, the space 35 between the shank and these tines being not less than one half the diameter of a frankfurter so that the frankfurter will clear the shank when the fork flops from one position to the other. Additional tines 36 and 37 are located in spaced relation to the inner tines a distance not less than the diameter of a frankfurter, and though only four tines are shown, this number can be increased by widening the head and the fork frame 38.

As will be noted, when the handle is held in one position as indicated in Fig. 2, the tines with their frankfurters 16 will be supported in a substantially level position for toasting one side 39 of the frankfurter. To toast the other side, the handle 11 is merely rotated in either direction through an angle of 180 degrees. In so doing the fork swings around to substantially the dotted position indicated at 40 then drops by its own weight back to the original position shown in full lines. Thus, to turn the frankfurters for toasting the other side it is merely necessary to rotate the handle through a half turn and this automatically turns the frankfurter and brings it back to a substantially level position.

The modification illustrated in Figs. 3 and 4 is in most respects the same as the foregoing except in construction; the fork being identical, but the shank being formed of a single rod 41 having the handle 11 at one end and a head 42 formed of sheet metal and having a pintle sleeve formed along one edge with the other edge fixed to the shank as indicated at 43 though it may be welded as indicated at 44 in Fig. 4. The stops are formed at one end of the pintle portion as indicated at 45 and 46.

This type is easily constructed since the pintle sleeve 47 can be curled around the pintle 48 after the fork is fully formed.

The modification illustrated in Figs. 5 and 6 is substantially equivalent to that shown in Figs. 1 and 2 except that in place of the coil forming a pintle sleeve and being formed at the center of the wire, a pair of spaced eyes 49 and 50 are formed at the ends of the wire and at the meeting points the wire is turned out as indicated at 51 and 52 to form the stops; one eye being formed over as indicated at 53 and the other formed under as indicated at 54 to cause the stops to be located in the proper positions.

Obviously, this toaster can be used for other toasting and barbecuing purposes. It is possible to barbecue meat, bake potatoes, and toast bread and buns as the tines are made sharp and thin, and preferably formed of non-staining or non-corrosive metal such as monel metal or stainless steel, or of any other suitable metal suitably placed with nickel or chromium.

I claim:

1. A toaster comprising a shank terminating in a head, a fork having tines and pivoted in said head on a transverse axis relative to the shank with said tines extending in the direction of the shank, and with said fork carrying food products having a gap to clear the shank when the fork drops from a position above the shank to a position below the shank, and stops carried by said head for limiting the movement of the fork to an angle of less than 45° to the axis of the shank, whereby when the shank is supported at an angle of approximately 45° downwardly inclined from the horizontal, the tines will be supported in a horizontal position, and when the shank is rotated about its axis through a half turn, the tines with their food products will drop past the shank to the first named position with the food products inverted; said head comprising an elongated plate having a pintle sleeve formed along its forward longitudinal edge on a transverse axis and having the shank fixed centrally of its rearward edge and including said stops located about the forward portions of the respective ends of the pintle sleeves for engaging the fork in the respective angular positions.

2. A toaster comprising a shank terminating in a head, a fork having tines and pivoted in said head on a transverse axis relative to the shank with said tines extending in the direction of the shank, and with said fork carrying food products having a gap to clear the shank when the fork drops from a position above the shank to a position below the shank, and stops carried by said head for limiting the movement of the fork to an angle of less than 45° to the axis of the shank, whereby when the shank is supported at an angle of approximately 45° downwardly inclined from the horizontal, the tines will be supported in a horizontal position, and when the shank is rotated about its axis through a half turn, the tines with their food products will drop past the shank to the first named position with the food products inverted; said fork comprising a C-shaped member having a pintle portion and inwardly projecting arms with the pintle portion pivotal in said head and with the inwardly projecting arms terminating in spaced relation to the shank to clear the shank when the fork drops from one position to the other, and with relatively thin sharp tines having their butt ends welded to said inwardly projecting arms and formed of non-tarnishable metal and projecting in alignment with the plane of the C-shaped member; the tines nearest adjacent to said shank being sufficiently spaced from opposite sides of the shank for clearance of food products such as sausages impaled on the tines.

JAMES L. C. McDONNELL.

REFERENCES CITED

The following references are of record in the file of this patent:

UNITED STATES PATENTS

| Number | Name | Date |
| --- | --- | --- |
| 155,789 | Camp | Oct. 13, 1874 |
| 2,090,793 | Hallum | Aug. 24, 1937 |

FOREIGN PATENTS

| Number | Country | Date |
| --- | --- | --- |
| 22,915 | Great Britain | Nov. 29, 1893 |
| 7,159 | Great Britain | Mar. 23, 1912 |
| 251,120 | Great Britain | Apr. 29, 1926 |
| 299,259 | Great Britain | Oct. 25, 1928 |